Patented Jan. 15, 1952

2,582,239

UNITED STATES PATENT OFFICE 2,582,239

WATER REPELLENT TREATMENT OF TEXTILES WITH LONG CHAIN SUBSTITUTED PHENOL ALDEHYDE RESIN EMULSION

Charles G. Dodd, Ann Arbor, Mich., assignor to the United States of America as represented by the Secretary of War No Drawing. Application August 13, 1946, Serial No. 690,349

19 Claims. (Cl. 117—138.8)

This invention relates to compositions and methods for water-repellent treatment of fabrics.

The problem of developing satisfactory water-repellent treatments for fabrics formed of non-cellulose synthetic fabrics, as, for example, high molecular weight linear polyamide (nylon) and polyvinyl resin fabrics, has proved to be more difficult than the development of effective treatments for fabrics formed of cotton or other cellulose fibers. Synthetic fibers of the non-cellulose type are ordinarily round and smooth, whereas cellulose fibers present an extremely rough, fuzzy and discontinuous surface. Roughened surfaces, even those microscopically rough, show a greatly increased effective advancing contact angle of water over that exhibited on a truly plane surface, provided the advancing angle on the plane surface is over 90°. For this reason, when samples of a high molecular weight linear polyamide fabric and cotton are treated with identical water-repellent agents, as, for example, a paraffin wax, which does not react with the surface of either fiber, the polyamide fabric exhibits an advancing contact angle of only about 120°, whereas cotton exhibits an angle of approximately 150°. The magnitude of the advancing contact angle of water is a measure of the water-repellency, the larger angle indicating the more water-repellent fabric. Cellulose fibers also have higher internal specific surface areas than non-cellulose synthetics, thus presenting a larger specific surface area for absorption of water-repellent agents and making possible a more extensive coating per unit of apparent area.

Objects of the present invention are to provide improved compositions and methods for water-repellent treatment of fabrics, particularly fabrics of the non-cellulose synthetic type; to provide improved water-repellent compositions capable of forming continuous water-repellent films over the entire surface area of non-cellulose synthetic fibers; to provide improved methods for applying water-repellent compositions to fibers to form surface-covering films on the fibers; and to provide for carrying out the foregoing objects in a facile, economical and efficient manner.

In accomplishing these and other objects of the present invention, I have provided improved compositions and methods of treatment, examples of which are hereinafter fully disclosed.

The requirements for a satisfactory water-repellent resin to be used for coating smooth synthetic fabrics such as nylon or Vinyon are the following:

1. The resin must be very highly water-repellent as determined by measurement of the advancing and receding contact angles of water on plane surfaces of the resin. In particular the advancing and receding angles should both be well above ninety degrees and should approach those angles measured on plane surfaces of paraffin wax.

2. The resin must not be horny or brittle when fully cured as this characteristic would destroy the desirable "hand" of textiles to which the resin is applied.

3. The resin must be as highly polymerized as possible when finally cured on the surface of the fibers or fabric so that its solubility in water, soap solutions used in laundering, and, if possible, in dry cleaning solvents be as low as is obtainable. Such low solubility would enhance the durability of permanency of the finish and incease the usefulness of the textile material.

4. The resin should be tough and possess a degree of mechanical strength as high as possible when fully cured on the surface of the fibers or fabric, also it should have no deleterious effect on the fibers or fabric to which it is applied. The mechanical strength of the treated textile material should be greater rather than the same as or lower than the untreated material.

I have discovered that it is possible to synthesize resins which will possess the above four desirable properties to a degree hitherto unobtained. Such resins may be synthesized by using substituted phenol, vinyl, styrene and other resin monomers which possess a long-chain-alkyl substituent containing twelve or more carbon atoms in the monomer in such a position so as not to interfere with the complete polymerization of the resin. The long chain substituent confers on the polymerized resin a degree of water-repellency approaching that of paraffin because the long chains are apparently oriented outwards from the surface. The effective surface of the resin, as far as water-repellency is concerned, is then very similar to the surface of paraffin wax.

Certain synthetic resins are capable of forming films over the entire surface of fibers of the non-cellulose type. When such resins have, as a substituent, aliphatic chains of twelve or more carbon atoms of the configuration $CH_3(CH_2)_x Y-$ (wherein $x$ is at least 10 and Y is $CH_2$ or CO), i. e. the alkyl ($CH_3 \cdot (CH_2)_x \cdot CH_2-$) or alkacyl $(CH_3 \cdot (CH_2)_x \cdot CO-)$ type, they are capable of forming highly water-repellent coatings on the fibers. I have found that synthetic resins, as, for example, those of the phenol-formaldehyde type, the monomers of which contain long chain aliphatic substituents, are capable of forming suitable coatings of the type referred to.

It is generally believed that polymerized phenol-formaldehyde resins consist of three-dimensional networks of phenolic molecules linked together by methylene chains in the ortho and para positions. Substituents in the meta position have been found to have little effect on condenstion reactions. It is thus possible to prepare polymerized phenolic resins which are highly water-repellent by employing as the phenolic raw material a phenol having a long aliphatic chain of preferably twelve to eighteen carbon atoms in the meta position on the ring.

I use the words "polymerization" and "polymerize" in their broad sense so as to include "condensation" and "condense."

Phenolic compounds of the class described may be produced synthetically by known processes, but synthetic production is at present impractical on account of cost. A natural product obtained from oil extracted from cashew-nut shells, described in the patent literature as cardanol (see U. S. Patents No. 2,284,369 and 2,346,256) contains a relatively high percentage of a phenolic compound that has a side chain in the meta position containing fourteen carbon atoms, but with one double bond. This compound may be separated by distillation from the oil in which it is found and utilized as the phenolic constituent for water-repellent compositions as described. It is preferable after distillation to hydrogenate the double bond in the side chain by known hydrogenation reactions to form meta-myristyl phenol or meta-tetradecyl phenol, a saturated compound in which the side chain is aliphatic. Hydrogenation takes place at normal or slightly increased pressures with the use of a metal catalyst, e. g., an Adam's platinum oxide catalyst. The hydrogenated material is a light yellow solid, with a melting point of about 50° C., and with a boiling point of about 380° C. under atmospheric pressure; its formula is $C_{14}H_{29}.C_6H_4.OH$ (1,3). Resin obtained from the hydrogenated material is more stable, possesses a higher degree of water repellency, and is of lighter color than resin obtained from the unsaturated material.

The tetradecyl phenol forms a resin in various media, by the action with formaldehyde or other substances capable of yielding a reactive methylene group, such as by dispersion of the reactants in an alkaline emulsion, dissolving the reactants in organic solvents or by reacting the solution of the phenol with gaseous formaldehyde. A preferred substance capable of yielding a reactive methylene group, suitable for carrying out the resin formation is hexamethylene tetramine, a condensation product of formaldehyde and ammonia; paraformaldehyde also gives highly satisfactory results, especially in the presence of a small amount of oxalic acid as a polymerization catalyst.

Another phenol-formaldehyde resin forming substance suitable for the purpose of the present invention is stearoyl phenol $(C_{17}H_{35}.CO-C_6H_4OH)$ preferably in the ortho or para position. It forms a highly water-repellent resin with formaldehyde or its derivatives, among which I prefer hexamethylene tetramine.

I have found that a suitable method for applying water-repellent resin to fibers involves a two stage reaction using a slightly basic catalyst. I shall describe examples of a process that may be employed in preparing water-repellent fabrics with the quantities of ingredients stated on laboratory scales; it is obvious, however, that these quantities may be suitably modified for larger scale operations.

A partially polymerized resin emulsion is prepared by dissolving approximately ten grams of meta-tetradecyl phenol and three grams of hexamethylene tetramine in approximately 100 cc. of isopropyl alcohol and refluxing the solution for about forty-five to fifty hours. A preliminary polymerization of the phenol and of the formaldehyde derivative takes place during the refluxing step. By varying the proportion of the phenol, the formaldehyde derivative, and the solvent, the time of the preliminary polymerization step may be considerably shortened; for instance, when ten grams of meta-tetradecyl phenol and two grams of hexamethylene tetramine are dissolved in 75 to 90 cc. of alcohol, the preliminary polymerization may be satisfactorily completed in from four to twenty hours.

At the end of the preliminary reaction period, about 90 per cent of the alcohol is removed by distillation and approximately 10 cc. of carbon tetrachloride and 30 cc. of toluene are added to the concentrated solution of resin; these added substances are substantially water-immiscible organic solvents. An emulsifying agent, preferably about 0.8 gram of stearic acid, is added to the resulting solution, and the whole is emulsified by pouring it slowly and with constant stirring into approximately 100 cc. of water held near the boiling point and containing an excess of an alkaline substance, preferably ammonium hydroxide. The resulting emulsion is stable and of a suitable concentration for treating fabrics.

Pieces of fabric may be impregnated with the resin emulsion by simple padding procedures similar to those commonly used in treating fabrics in finishing operations. The impregnated fabric may be dried in air and oven-cured. The curing induces further polymerization and the formation of continuous films of resin over the smooth fiber surface. The first few hours of curing should be done in an oven with air circulation to remove the vapors produced during this stage. Later stages of curing may be carried out at the same temperature, but the fabric may be loosely rolled to occupy less space in the oven. Temperatures should be maintained uniform throughout the oven. Forced hot air circulation is the most satisfactory.

It is necessary to thoroughly clean the polyamide, polyvinyl or other smooth fiber synthetic fabric before treatment with the water-repellent resin. All oils used to lubricate the fibers during weaving (such as polyvinyl alcohols in the case of a polyamide fabric) must be thoroughly removed. In addition, any sizing applied to the fabric must be completely removed. This may require both thorough laundering and dry cleaning prior to application of the resin.

The following specific examples illustrate the application of the waterproofing treatment in accordance with the present invention to non-cellulose synthetic fabrics; without, however,

Example 1

A high molecular weight linear polyamide fabric was padded with the above-described emulsion, dried in air, and cured in an oven held at approximately 70° C. for two to three days. The emulsion which comprised a partly polymerized resin at the time of the application, was more completely polymerized by the curing step and formed an insoluble, water-repellent, continuous film over the entire surface of the polyamide fibers. The coated polyamide fabric was very flexible, stronger than the uncoated fabrics, and as water-repellent as any cotton fabric which has been subjected to waterproofing treatment with long chain paraffin hydrocarbon. The advancing contact angle of water on the treated polyamide fabric was about 120°. Laundering tests showed that the water-repellent properties of the coated polyamide fabric were but slightly decreased by repeated laundering, and was equal to the degree of water-repellency retained by cotton fabrics treated by any water-repellency treatments now known.

Example 2

A sample of polyvinyl fabric was padded with the same emulsion used in the preceding example, air dried, and oven-cured at the temperature of about 55° C. for three to four days. Results were substantially identical with those reached in the preceding example. The lower curing temperature as compared with the temperature used in connection with a high molecular weight linear polyamide fabric, was necessitated by the propensity of polyvinyl fabric to soften and shrink at 65° C. The finished fabric was flexible, stronger than the original fabric, and highly water-repellent. Laundering or cleaning with solvents had little effect on these properties of the fabric.

Instead of applying the partially polymerized resin to the fabric from an emulsion, it is also possible to apply a solution of the phenol and formaldehyde or formaldehyde derivative directly to the fabric without emulsification. As solvents, I prefer ethyl alcohol or isopropyl alcohol. The process is the same as the processes described above in connection with the use of a water-emulsion except that the steps of solvent removal and of emulsification are omitted. During the curing step, it is necessary to carry off the vapors given off by the solvent. This may be accomplished in the same manner as in the case of fabric impregnated with an emulsion, e. g., by forced circulation of heated air.

The temperature of the water used in laundering or of the solvent used in dry cleaning the treated fabrics should not exceed 80° C., best results are reached at about 60° C.

Although I have disclosed but certain ingredients and proportions that are suitable for carrying out the invention, it is obvious that the invention could be practical with variations in the ingredients or proportions without departing from the spirit of the invention. Therefore, I do not wish to be limited by the disclosure set forth, but only by the scope of the appended claims.

I claim:

1. Process of preparing a tetradecyl phenol-aldehyde resin emulsion, comprising forming a meta-tetradecyl phenol-aldehyde condensate by dissolving 10 parts by weight of meta-tetradecyl phenol and 2 to 3 parts by weight of hexamethylene tetramine in alcohol, refluxing the solution, evaporating a major part of the alcohol, dissolving the condensate in a water-immiscible organic solvent, adding stearic acid as an emulsifying agent, and emulsifying the dissolved condensate in an alkaline water solution at a temperature near the boiling point of said last-named solution, whereby a stable textile-treating emulsion is obtained.

2. Process of preparing a tetradecyl phenol-aldehyde resin emulsion, comprising forming a meta-tetradecyl phenol-aldehyde condensate by dissolving and refluxing 10 grams of meta-tetradecyl phenol and 2 to 3 grams of hexamethylene tetramine in 75 to 90 cc. of alcohol, evaporating about 90 per cent of the alcohol, adding 10 cc. of carbon tetrachloride and 30 cc. of toluene and a minor proportion of stearic acid, and emulsifying the condensate in 100 cc. of a water solution of ammonium hydroxide at a temperature near the boiling point of said last-named solution, whereby a stable textile-treating emulsion is obtained.

3. Process of preparing a substituted-phenol aldehyde resin emulsion, comprising forming a substituted-phenol aldehyde condensate by dissolving in a water-soluble alcohol a phenol having as its sole substituent a saturated aliphatic side chain of at least 12 carbon atoms of the configuration $CH_3(CH_2)_x Y-$ wherein $x$ is at least 10 and wherein Y is selected from the $-CH_2-$ group attached in the meta position to the phenol ring and the $-CO-$ group attached to the phenol ring, and an excess of a substance capable of yielding a reactive methylene group, said substance being a member selected from the group consisting of formaldehyde, formaldehyde polymers and hexamethylene tetramine, heating said solution until said phenol and said substance are partially condensed, then evaporating a major part of said alcohol, then adding an inert organic water-immiscible solvent, and emulsifying the solution in a hot alkaline water solution, whereby a stable textile-treating emulsion is obtained.

4. Process of preparing a substituted phenol aldehyde resin emulsion, comprising forming a substituted-phenol aldehyde condensate by dissolving in a water-soluble alcohol a phenol having as its sole substituent a saturated aliphatic side chain of at least 12 carbon atoms of the configuration $CH_3(CH_2)_x CH_2-$ wherein $x$ is at least 10 and being attached to the phenol ring in the meta position and an excess of a substance capable of yielding a reactive methylene group, said substance being a member selected from the group consisting of formaldehyde, formaldehyde polymers and hexamethylene tetramine, heating said solution until said phenol and said substance are partially condensed, then evaporating a major part of said alcohol, then adding an inert organic water-immiscible solvent, and emulsifying the solution in a hot alkaline water solution, whereby a stable textile-treating emulsion is obtained.

5. A process of preparing a substituted-phenol aldehyde resin emulsion, comprising forming a substituted-phenol aldehyde condensate by dissolving in a water-soluble alcohol meta-tetradecyl phenol and an excess of a substance capable of yielding a reactive methylene group, said substance being a member selected from the group consisting of formaldehyde, formaldehyde polymers and hexamethylene tetramine, heating said solution until said phenol and said substance are partially condensed, then evaporating a major part of said alcohol, then adding an inert organic water-immiscible solvent, and emulsifying the solution in a hot alkaline water solution, whereby a stable textile-treating emulsion is obtained.

6. Process of preparing a substituted-phenol aldehyde resin emulsion, comprising forming a substituted-phenol aldehyde condensate by dissolving in a water-soluble alcohol a phenol having as its sole substituent a saturated aliphatic side chain of at least 12 carbon atoms of the configuration $CH_3(CH_2)_xCO—$ wherein $x$ is at least 10, and an excess of a substance capable of yielding a reactive methylene group, said substance being a member selected from the group consisting of formaldehyde, formaldehyde polymers and hexamethylene tetramine, heating said solution until said phenol and said substance are partially condensed, then evaporating a major part of said alcohol, then adding an inert organic water-immiscible solvent, and emulsifying the solution in a hot alkaline water solution, whereby a stable textile-treating emulsion is obtained.

7. A process of preparing a substituted-phenol aldehyde resin emulsion, comprising forming a substituted-phenol aldehyde condensate by dissolving in a water-soluble alcohol stearoyl phenol and an excess of a substance capable of yielding a reactive methylene group, said substance being a member selected from the group consisting of formaldehyde, formaldehyde polymers and hexamethylene tetramine, heating said solution until said phenol and said substance are partially condensed, then evaporating a major part of said alcohol, then adding an inert organic water-immiscible solvent, and emulsifying the solution in a hot alkaline water solution, whereby a stable textile-treating emulsion is obtained.

8. A stable textile-treating emulsion made by the process of claim 3.

9. A stable textile-treating emulsion made by the process of claim 4.

10. A stable textile-treating emulsion made by the process of claim 5.

11. A stable textile-treating emulsion made by the process of claim 1.

12. A stable textile-treating emulsion made by the process of claim 2.

13. A stable textile-treating emulsion made by the process of claim 6.

14. A stable textile-treating emulsion made by the process of claim 7.

15. The method of forming a continuous deposit of a phenol aldehyde resin on a smooth-fiber thermoplastic synthetic resinous fabric selected from the group consisting of polyamide fabric and vinyl polymer fabric, comprising forming a substituted phenol aldehyde condensate by dissolving in a water-soluble alcohol a phenol having as its sole substituent a saturated aliphatic side chain of at least 12 carbon atoms of the configuration $CH_3(CH_2)_x.Y—$ wherein $x$ is at least 10 and wherein Y is selected from the —$CH_2—$ group attached in the meta position to the phenol ring and the —CO— group attached to the phenol ring, and an excess of a substance capable of yielding a reactive methylene group, said substance being a member selected from the group consisting of formaldehyde, formaldehyde polymers and hexamethylene tetramine, heating said solution until said phenol and said substance are partially condensed, then evaporating a major part of said alcohol, then adding an inert organic water-immiscible solvent, and emulsifying the solution in a hot alkaline water solution, coating said fabric with said condensate from said emulsion, and curing the coated fabric at an elevated temperature below the softening point of said fabric, whereby a continuous water-insoluble and strongly fabric-adhesive deposit is formed on said fabric.

16. The method of forming a continuous deposit of a phenol aldehyde resin on a smooth-fiber thermoplastic synthetic resinous fabric selected from the group consisting of polyamide fabric and vinyl polymer fabric, comprising forming a substituted-phenol aldehyde condensate by dissolving in a water-soluble alcohol a phenol having as its sole substituent a saturated aliphatic side chain of at least 12 carbon atoms of the configuration $CH_3(CH_2)_x.CH_2—$ wherein $x$ is at least 10 and being attached to the phenol ring in the meta position and an excess of a substance capable of yielding a reactive methylene group, said substance being a member selected from the group consisting of formaldehyde, formaldehyde polymers and hexamethylene tetramine, heating said solution until said phenol and said substance are partially condensed, then evaporating a major part of said alcohol, then adding an inert organic water-immiscible solvent, and emulsifying the solution in a hot alkaline water solution, coating said fabric with said condensate from said emulsion, and curing the coated fabric at an elevated temperature below the softening point of said fabric, whereby a continuous water-insoluble and strongly fabric-adhesive deposit is formed on said fabric.

17. The method of forming a continuous deposit of a phenol aldehyde resin on a smooth-fiber thermoplastic synthetic resinous fabric selected from the group consisting of polyamide fabric and vinyl polymer fabric, comprising forming a substituted-phenol aldehyde condensate by dissolving in a water-soluble alcohol meta tetradecyl phenol and an excess of a substance capable of yielding a reactive methylene group, said substance being a member selected from the group consisting of formaldehyde, formaldehyde polymers and hexamethylene tetramine, heating said solution until said phenol and said substance are partially condensed, then evaporating a major part of said alcohol, then adding an inert organic water-immiscible solvent, and emulsifying the solution in a hot alkaline water solution, coating said fabric with said condensate from said emulsion, and curing the coated fabric at an elevated temperature below the softening point of said fabric, whereby a continuous water-insoluble and strongly fabric-adhesive deposit is formed on said fabric.

18. The method of forming a continuous deposit of a phenol aldehyde resin on a smooth-fiber thermoplastic synthetic resinous fabric selected from the group consisting of polyamide fabric and vinyl polymer fabric, comprising forming a substituted-phenol aldehyde condensate by dissolving in a water-soluble alcohol a phenol having as its sole substituent a saturated aliphatic side chain of at least 12 carbon atoms of the configuration $CH_3(CH_2)_x . CO—$ wherein $x$ is at least 10 and an excess of a substance capable of yielding a reactive methylene group, said substance being a member selected from the group consisting of formaldehyde, formaldehyde polymers and hexamethylene tetramine, heating said solution until said phenol and said substance are partially condensed, then evaporating a major part of said alcohol, then adding an inert organic water-immiscible solvent, and emulsifying the solution in a hot alkaline water solution, coating said fabric with said condensate from said emulsion, and curing the coated fabric at an elevated temperature below the softening point of said fabric, whereby a continuous water-insoluble and strongly fabric-adhesive deposit is formed on said fabric.

19. The method of forming a continuous deposit of a phenol aldehyde resin on a smooth-fiber thermoplastic synthetic resinous fabric selected from the group consisting of polyamide fabric and vinyl polymer fabric, comprising forming a substituted-phenol aldehyde condensate by dissolving in a water-soluble alcohol stearoyl phenol and an excess of a substance capable of yielding a reactive methylene group, said substance being a member selected from the group consisting of formaldehyde, formaldehyde polymers and hexamethylene tetramine, heating said solution until said phenol and said substance are partially condensed, then evaporating a major part of said alcohol, then adding an inert organic water-immiscible solvent, and emulsifying the solution in a hot alkaline water solution, coating said fabric with said condensate from said emulsion, and curing the coated fabric at an elevated temperature below the softening point of said fabric, whereby a continuous water-insoluble and strongly fabric-adhesive deposit is formed on said fabric.

CHARLES G. DODD.

REFERENCES CITED

The following references are of record in the file of this patent:

UNITED STATES PATENTS

| Number | Name | Date |
|---|---|---|
| 1,987,549 | Courtney | Jan. 8, 1935 |
| 2,062,676 | Reiff | Dec. 1, 1936 |
| 2,175,393 | Hentrich et al. | Oct. 10, 1939 |
| 2,209,903 | Ralston et al. | July 30, 1940 |
| 2,220,856 | Waltman | Nov. 5, 1940 |
| 2,284,369 | Caplan | May 26, 1942 |
| 2,346,256 | Harvey | Apr. 11, 1944 |
| 2,370,362 | Light | Feb. 27, 1945 |
| 2,420,157 | West | May 6, 1947 |